United States Patent
Jung et al.

(10) Patent No.: US 11,766,988 B2
(45) Date of Patent: Sep. 26, 2023

(54) HYBRID GAS GENERATOR, METHOD FOR OPERATING A HYBRID GAS GENERATOR, AIRBAG MODULE AND VEHICLE SAFETY SYSTEM

(71) Applicant: TRW Airbag Systems GmbH, Aschau a. Inn (DE)

(72) Inventors: Christian Jung, Mühldorf am Inn (DE); Sebastian Bierwirth, Rechtmehring (DE); Johannes Ebner, Mühldorf am Inn (DE); Hans-Peter Neumayer, Ampfing (DE); Martin Oberstarr, Polling (DE); Daniel Hillmann, Gars Bahnhof (DE); Uta Isenmann, Waldkraiburg (DE); Detlef Last, Mühldorf am Inn (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 161 days.

(21) Appl. No.: 16/477,540

(22) PCT Filed: Nov. 20, 2017

(86) PCT No.: PCT/EP2017/079754
§ 371 (c)(1),
(2) Date: Jul. 12, 2019

(87) PCT Pub. No.: WO2018/133977
PCT Pub. Date: Jul. 26, 2018

(65) Prior Publication Data
US 2019/0359166 A1    Nov. 28, 2019

(30) Foreign Application Priority Data

Jan. 18, 2017    (DE) .......................... 102017100857.8

(51) Int. Cl.
*B60R 21/272*    (2006.01)
*B60R 21/268*    (2011.01)
(Continued)

(52) U.S. Cl.
CPC ........ *B60R 21/272* (2013.01); *B60R 21/2644* (2013.01); *B60R 21/36* (2013.01); *B60R 2021/2648* (2013.01)

(58) Field of Classification Search
CPC ........................... B60R 21/268; B60R 21/272
See application file for complete search history.

(56) References Cited

U.S. PATENT DOCUMENTS 5,660,412 A    8/1997    Renfroe et al.
5,711,546 A *  1/1998    Hamilton .............. B60R 21/272
                                                     280/736

(Continued)

FOREIGN PATENT DOCUMENTS

DE    102016120986    5/2018
EP    1236625         9/2002
(Continued)

*Primary Examiner* — Barry Gooden, Jr.
(74) *Attorney, Agent, or Firm* — TAROLLI, SUNDHEIM, COVELL & TUMMINO L.L.P

(57) ABSTRACT

The invention relates to a hybrid gas generator (10) which comprises a compressed gas chamber (20) and an igniting unit (30), wherein the compressed gas chamber (20) is closed by a first igniter-side bursting membrane (21) and a second bursting membrane (22). According to the invention, a first, rapidly burning-off pyrotechnic agent (51) and a second pyrotechnic agent (52) burning off slowly in comparison to the first pyrotechnic agent (51) are located in the hybrid gas generator (10), wherein the second bursting membrane (22) is openable by positive pressure which can be generated in the compressed gas chamber (20) and the first pyrotechnic agent (51) is separated from the second pyrotechnic agent (52) in such a manner that the positive (Continued)

pressure in the compressed gas chamber (20) for opening the second bursting membrane (22) can be generated by the first pyrotechnic agent (51).

10 Claims, 3 Drawing Sheets

(51) Int. Cl.
  *B60R 21/264* (2006.01)
  *B60R 21/36* (2011.01)

(56) References Cited

U.S. PATENT DOCUMENTS

| | | | |
|---|---|---|---|
| 5,732,972 A * | 3/1998 | Johnson | B60R 21/272 |
| | | | 222/3 |
| 5,788,275 A * | 8/1998 | Butt | B60R 21/272 |
| | | | 137/68.13 |
| 5,821,448 A * | 10/1998 | Hamilton | B60R 21/272 |
| | | | 102/288 |
| 5,851,027 A * | 12/1998 | DiGiacomo | B60R 21/272 |
| | | | 280/736 |
| 6,019,389 A * | 2/2000 | Burgi | B60R 21/272 |
| | | | 280/736 |
| 6,042,146 A * | 3/2000 | Bauer | B60R 21/272 |
| | | | 280/737 |
| 6,068,292 A | 5/2000 | Renz | |
| 6,234,523 B1 * | 5/2001 | Tokoro | B60R 21/2644 |
| | | | 280/737 |
| 6,237,950 B1 | 5/2001 | Cook et al. | |
| 6,382,668 B1 * | 5/2002 | Goetz | B60R 21/264 |
| | | | 280/741 |
| 6,488,310 B1 * | 12/2002 | Ryobo | B60R 21/272 |
| | | | 280/736 |
| 6,793,244 B1 | 9/2004 | Katsuda et al. | |
| 6,808,204 B1 * | 10/2004 | Katsuda | B60R 21/272 |
| | | | 280/741 |
| 7,147,249 B2 * | 12/2006 | Hofmann | B60R 21/2644 |
| | | | 280/741 |
| 7,320,479 B2 * | 1/2008 | Trevillyan | B60R 21/272 |
| | | | 280/736 |
| 8,052,169 B2 * | 11/2011 | Yano | B60R 21/272 |
| | | | 280/737 |
| 9,205,802 B1 | 12/2015 | Lang et al. | |
| 9,789,845 B2 * | 10/2017 | Ebner | B60R 21/272 |
| 10,046,728 B2 * | 8/2018 | Bierwirth | B60R 21/26 |
| 10,336,289 B2 * | 7/2019 | Ebner | B60R 21/274 |
| 11,247,634 B2 * | 2/2022 | Bierwirth | B60R 21/272 |
| 2002/0053789 A1 | 5/2002 | Fujimoto et al. | |
| 2002/0190510 A1 | 12/2002 | Yamazaki | |
| 2003/0001369 A1 * | 1/2003 | Iwai | B01D 53/565 |
| | | | 280/741 |
| 2003/0001370 A1 * | 1/2003 | Ryobo | B60R 21/272 |
| | | | 280/741 |
| 2003/0034641 A1 * | 2/2003 | Zimbrich | B60R 21/272 |
| | | | 280/741 |
| 2004/0100079 A1 * | 5/2004 | Yamazaki | B60R 21/261 |
| | | | 280/741 |
| 2005/0146123 A1 | 7/2005 | Bergmann et al. | |
| 2006/0055160 A1 * | 3/2006 | Cook | B60R 21/272 |
| | | | 280/741 |
| 2007/0075535 A1 * | 4/2007 | Trevillyan | B60R 21/272 |
| | | | 280/737 |
| 2008/0111358 A1 * | 5/2008 | Jackson | B60R 21/276 |
| | | | 280/741 |
| 2011/0018243 A1 * | 1/2011 | Yano | B60R 21/272 |
| | | | 280/741 |
| 2014/0305330 A1 * | 10/2014 | Stevens | B60R 21/272 |
| | | | 102/530 |
| 2016/0159314 A1 | 6/2016 | Ebner et al. | |
| 2017/0015273 A1 * | 1/2017 | Kobayashi | B60R 21/274 |
| 2017/0028964 A1 * | 2/2017 | Bierwirth | B60R 21/26 |
| 2017/0232923 A1 * | 8/2017 | Ebner | B60R 21/272 |
| | | | 280/737 |
| 2017/0259775 A1 * | 9/2017 | Bierwirth | B60R 21/272 |
| 2018/0141514 A1 * | 5/2018 | Last | C06D 5/10 |
| 2019/0291684 A1 * | 9/2019 | Bierwirth | B60R 21/2644 |
| 2019/0351864 A1 * | 11/2019 | Hillmann | B60R 21/272 |
| 2021/0394704 A1 * | 12/2021 | Bierwirth | B60R 21/261 |
| 2021/0402950 A1 * | 12/2021 | Englbrecht | B60R 21/2644 |

FOREIGN PATENT DOCUMENTS

| | | |
|---|---|---|
| EP | 1459946 | 9/2004 |
| FR | 2865172 | 7/2005 |
| JP | 2001080449 | 3/2001 |

\* cited by examiner

HYBRID GAS GENERATOR, METHOD FOR OPERATING A HYBRID GAS GENERATOR, AIRBAG MODULE AND VEHICLE SAFETY SYSTEM

RELATED APPLICATIONS

This application corresponds to PCT/EP2017/079754, filed Nov. 20, 2017, which claims the benefit of German Application No. 10 2017 100 857.8, filed Jan. 18, 2017, the subject matter of which are incorporated herein by reference in their entirety.

BACKGROUND OF THE INVENTION

The invention relates to a hybrid gas generator, comprising a compressed gas chamber and an igniting unit, wherein the compressed gas chamber is closed by a first igniter-side bursting membrane and a second bursting membrane, according to the preamble of claim 1.

Furthermore, the invention relates to a method for operating a hybrid gas generator. Moreover, the invention relates to an airbag module comprising a hybrid gas generator according to the invention and a vehicle safety system comprising a hybrid gas generator according to the invention or an airbag module according to the invention.

From DE 203 19 584 U1 a gas generator comprising a pressure chamber is known, for example. The pressure chamber may be filled with compressed gas of helium, a helium/argon mixture or a helium/argon/oxygen mixture at a pressure of from 240 and 1500 bars.

Thus, high loads are acting on the compressed gas chamber wall and, resp., the compressed gas chamber housing so that the compressed gas chamber wall is designed to be appropriately stable and, resp., has to have great material thickness.

Moreover, in known hybrid gas generators it is required to design the compressed gas container to fit the operating pressure maximal in the case of operation.

SUMMARY OF THE INVENTION

It is the object of the invention to state a developed hybrid gas generator, wherein the compressed gas chamber may be designed to have thinner walls. In particular, a hybrid gas generator is to be described the operating pressures of which can be kept low. Further, it is the object of the invention to describe a developed method for operating a hybrid gas generator. It is another object of the invention to describe an airbag module as well as a vehicle safety system comprising a developed hybrid gas generator.

In accordance with the invention, this object is achieved with respect to a hybrid gas generator by the subject matter of claim 1, with respect to a method for operating a hybrid gas generator by the subject matter of claim 7, with respect to an airbag module by the subject matter of claim 10 and with respect to a vehicle safety system by claim 11.

For achieving the afore-mentioned object, the invention provides a hybrid gas generator comprising a compressed gas chamber and an igniting unit, wherein the compressed gas chamber is closed by a first igniter-side bursting membrane and a second bursting membrane. The second bursting membrane may also be referred to as diffuser-side bursting membrane and is preferably positioned, with respect to the direction of the longitudinal axis of the hybrid gas generator, opposite to the first igniter-side bursting membrane. In particular, an opened second bursting membrane serves for fluid communication between the compressed gas chamber and a diffuser and/or a filter package.

In accordance with the invention, a first rapidly burning-off pyrotechnic agent and a second pyrotechnic agent burning off slowly as compared to the first pyrotechnic agent are located in the hybrid gas generator. The second bursting membrane can be opened by positive pressure which can be generated in the compressed gas chamber. The first pyrotechnic agent is separated from the second pyrotechnic agent in such a manner that the positive pressure in the compressed gas chamber for opening the second bursting membrane can be generated by the first pyrotechnic agent.

The first pyrotechnic agent may also be referred to as first pyrotechnic filling. The first pyrotechnic agent may consist of compressed pellets and/or granules and/or extruded bodies and/or of annular agents.

The second pyrotechnic agent may equally be provided in the form of compressed pellets and/or granules and/or extruded bodies and/or in the form of rings.

In another embodiment, it is possible that the first and/or the second pyrotechnic agent is/are in the form of a stack of annular molded bodies or, resp., segments of rings.

The first pyrotechnic agent may especially be an igniting mixture and, resp., an igniting agent which burns off rapidly. The second pyrotechnic agent may also be referred to as propellant, with the second pyrotechnic agent burning off more slowly as compared to the first pyrotechnic agent.

The first pyrotechnic agent is, compared to the second pyrotechnic agent, the more rapid pyrotechnics. The first pyrotechnic agent thus has a higher or more rapid gas generation rate. The gas generation rate of the first pyrotechnics may be adjusted, for example, by the grain size, i.e. the size of the individual bodies of the individual pyrotechnic elements and/or on the basis of chemical parameters.

Preferably, the first pyrotechnic agent is disposed more closely to the igniting unit, especially more closely to the igniter of the igniting unit, than the second pyrotechnic agent. In accordance with the invention, the first pyrotechnic agent is ignited first in time. Within extremely short time, preferably within 3 milliseconds, due to the first pyrotechnic agent positive pressure which serves for opening the second bursting membrane can be developed in the compressed gas chamber. In other words, the second bursting membrane is opened by forming positive pressure in the compressed gas chamber. In particular, the second bursting membrane is opened neither by forming a shockwave nor by a (movable) opening spike nor by a projectile.

Before the second bursting membrane is opened by the positive pressure built up in the compressed gas chamber, the second pyrotechnic agent is already, at least partially, ignited. The second bursting membrane is opened so rapidly that, at the time of opening the second bursting membrane, the entire second pyrotechnic agent or the entire second pyrotechnic filling has not yet completely ignited or is ignited. That is to say that the maximum operating pressure within the compressed gas chamber is lower than in comparison to an already performed complete through-ignition of the second pyrotechnic agent. For this reason, the wall and, resp., the compressed gas chamber housing of the compressed gas chamber can be formed with a smaller wall thickness. On the one hand, this results in considerable weight savings and, on the other hand, in a reduction of costs.

The first pyrotechnic agent and the second pyrotechnic agent are separated from each other. In other words, the pyrotechnic fillings are not mixed and preferably do not contact each other. The two pyrotechnic agents are located in different portions and/or different chambers of the hybrid gas generator, especially of the compressed gas chamber.

Preferably, the first pyrotechnic agent and the second pyrotechnic agent are accommodated in the compressed gas chamber. However, it is also possible that merely the second pyrotechnic agent is accommodated in the compressed gas chamber and the first pyrotechnic agent is positioned outside the compressed gas chamber.

In one embodiment of the invention, it is possible that the first pyrotechnic agent is located in a first portion of a central guide tube close to the igniter. The second pyrotechnic agent, on the other hand, may be located in an intermediate chamber. The intermediate chamber is preferably formed between an inner face of a compressed gas chamber housing and the central guide tube.

Especially preferred, the guide tube extends at least from an area of the first bursting element to an area of the second bursting element and, resp., substantially to the nearest environment of the second bursting element. In other words, the guide tube extends at least from the first bursting element to immediately ahead of the second bursting element.

The guide tube preferably has an oblong (circular) cylindrical housing. The length of the guide tube may correspond to at least half of the total length of the compressed gas chamber, especially to at least 70% of the total length of the compressed gas chamber, especially to at least 80% of the total length of the compressed gas chamber. The first portion of the guide tube close to the igniter may especially be the first 25% on the igniter side of the guide tube, especially the first 20% of the guide tube, especially the first 15% of the guide tube, especially the first 10% of the guide tube.

The second pyrotechnic agent is preferably located in the described intermediate chamber. It is possible that the second pyrotechnic agent is separated or spaced apart from the first pyrotechnic agent not only radially but also axially. For this purpose, a packing may be provided in the, preferably ring-shaped, intermediate chamber. The packing is especially arranged axially downstream of the first portion of the central guide tube close to the igniter in the direction of the compressed gas chamber outlet. Further, it is possible that the packing is formed level with the first bursting element or level with the igniter. In this case, the first pyrotechnic agent is radially surrounded by the second pyrotechnic agent, wherein the wall of the guide tube is formed between the first pyrotechnic agent and the second pyrotechnic agent.

The first portion of the guide tube may be delimited by a disk element having at least one, preferably axially designed, gas outlet, wherein at least two radial discharge openings are formed in the first portion of the guide tube. Due to the formation of radial discharge openings, in the idle position of the hybrid gas generator, i.e. prior to activation thereof, the stored compressed gas present in the compressed gas chamber flows also into the guide tube, especially into the first portion of the guide tube close to the igniter, so that the first pyrotechnic agent, too, is surrounded by stored compressed gas. The guide tube is preferably formed in axial extension of the igniter chamber, especially of the housing of the igniter chamber.

Of preference, the first portion of the central guide tube close to the igniter is formed between the first bursting membrane and the described disk element. Especially by the area ratio of the discharge openings to the gas outlet of the disk element, the flow behavior of the gas ignitable by the first pyrotechnic agent may be definable. Due to the radial discharge openings, at least part of the gas ignited by the first pyrotechnic agent may flow into the, preferably annular, intermediate chamber. As a result, the second pyrotechnic agent may be ignited.

Another part of the gas ignited by the first pyrotechnic agent, on the other hand, flows out of the gas outlet of the disk element into the further portion of the central guide tube. Because of the described area ratio, the amount of the ignition gases and, resp., ignition particles of the first pyrotechnic agent can be adjusted and, resp., divided. In other words, it is adjustable how many and, resp., which amount of ignition gases and ignition particles of the first pyrotechnic agent are used for directly generating positive pressure in the compressed gas chamber, and thus for opening the second bursting membrane, and how many ignition gases and, resp., ignition particles are used for igniting the second pyrotechnic agent.

The intermediate chamber may be delimited in a direction of the longitudinal axis L of the hybrid gas generator by means of a limiting disk. Moreover, it is possible for the guide tube to have at least two inlet openings in the vicinity of a diffuser. The inlet openings serve for the fluid communication of the intermediate chamber with the interior of the guide tube.

The limiting disk may also be in the form of a screen and may be closed in the idle state of the hybrid gas generator, especially tamped by means of a metallic foil made from steel, copper or aluminum.

The limiting disk may especially be an expanded-metal disk. The limiting disk preferably is ring-shaped and is slipped onto the guide tube. The limiting disk prevents propellant from flowing out of the intermediate chamber into the end portion of the compressed gas chamber.

The compressed gas chamber may be filled with compressed gas of helium, a helium/argon mixture or a helium/argon/oxygen mixture at a pressure of from 250 to 1500 bars in the idle state of the hybrid gas generator.

When designing a (ring-shaped) intermediate chamber, the propelling gas, i.e. the gas forming upon activation of the hybrid gas generator by ignition of the second pyrotechnic agent, is (re)directed from radially outside, i.e. from the intermediate chamber, to radially inside, i.e. into the guide tube and, resp., the interior of the guide tube. Burn-off particles and/or pyrotechnic elements are withheld in the intermediate chamber by the formation of the limiting disk, especially in the form of a screen.

In a further embodiment of the invention, the second pyrotechnic agent may be axially separated, especially spaced apart, from the first pyrotechnic agent. In other words, the second pyrotechnic agent may be formed to be axially downstream of the first pyrotechnic agent. Moreover, between the first pyrotechnic agent and the second pyrotechnic agent a longitudinal distance may be formed.

The first pyrotechnic agent may be located in a pyrotechnic chamber close to the igniter and the second pyrotechnic agent may be located in a portion of the compressed gas chamber in the form of a combustion chamber. Preferably, the combustion chamber is configured to be spaced apart from the pyrotechnic chamber. In an especially preferred embodiment, the combustion chamber is spaced apart from the pyrotechnic chamber by a resilient element. The igniter-side beginning of the combustion chamber may be formed by a packing, with the packing being pressed away from the pyrotechnic chamber due to a spring abutting on the pyrotechnic chamber, especially in the idle state of the hybrid gas generator. At the diffuser-side end of the combustion chamber, preferably a combustion chamber screen or a limiting disk is formed. A tamping, for example in the form of a metal disk or metal foil made from copper, aluminum or steel, may be configured on the combustion chamber-side inner surface of the combustion chamber screen or the limiting disk.

The propelling gas, which may also be referred to as propelling burn-off gas and is formed during or after burn-off of the two pyrotechnic agents, especially of the second pyrotechnic agent burning off slowly, serves for filling a gas bag, especially an airbag, for example.

On the whole, the outer wall and, resp., the compressed gas chamber housing of the hybrid gas generator must be dimensioned for generating a maximum gas generation rate of the pyrotechnic agents, especially of the second pyrotechnic agent burning off slowly. No thickened portions or reductions in diameter or rolled portions are necessary. Moreover, no highly charged prefabricated igniter is required. Rather, a low-cost standard igniter adapted to ignite a first pyrotechnic agent arranged downstream thereof may be used.

Another aspect of the invention relates to a method for operating a hybrid gas generator according to the invention. The method according to the invention is characterized by the following method steps:

a) activating an igniting unit of the hybrid gas generator;
b) igniting the first pyrotechnic agent;
c) building up positive pressure inside the compressed gas chamber;
d) igniting the second pyrotechnic agent and partially generating a propelling gas;
e) opening the second bursting element due to the built-up positive pressure;
f) generating further propelling gas by the second pyrotechnic agent;
g) outflowing of the further propelling gas through the opened second bursting element.

Of preference, the method according to the invention is carried out in the given order. According to the invention, the second pyrotechnic agent may burn-off staggered in time of the positive pressure built up in the compressed gas chamber. Merely or at least mostly the positive pressure generated in the compressed gas chamber which is preferably formed primarily by igniting the first pyrotechnic agent serves for opening the second bursting element. The further generated propelling gas, on the other hand, serves for filling a gas bag, especially an airbag.

The first pyrotechnic agent acts as an ignition booster for the second pyrotechnic agent and as a positive pressure generator. The positive pressure required for opening the second bursting element is generated prior to reaching the maximum gas generation rate of the second pyrotechnic agent.

The maximum gas generation rate of the second pyrotechnic agent and, resp., of the propellant occurs subsequent to step e). In other words, the propellant of the second pyrotechnic agent reaches its maximum gas generation rate only after the compressed gas chamber is opened, i.e. only after the second bursting element is opened. As a result, the operating pressures in the hybrid gas generator are kept low. Moreover, the gas generation and, resp., gas delivery is prolonged and kept steady over a longer period of time. The service life of the gas bag or, resp., airbag is thus positively increased. Reaching the maximum gas generation rate after opening the second bursting element helps to bring about controlled resupply of propelling gas.

Preferably, bursting of the first bursting element is carried out subsequent to step a) or b). This means that bursting or opening the first bursting element directly after activating the igniting unit may be provided before the first pyrotechnic agent is ignited, preferably with a design of the hybrid gas generator in which the first and second pyrotechnic agents are located inside the compressed gas chamber. However, such opening of the first bursting element may also be performed only after the first pyrotechnic agent has been ignited, preferably when the first pyrotechnic agent is located outside the compressed gas chamber.

Due to the adjustable area ratio of the outlet openings in the first portion of the guide tube to the gas outlet of the disk element, the hybrid gas generator may be adjusted to differently designed second pyrotechnic agents, i.e. to differently ignitable main propellants which may differ e.g. by their shape, size or chemical composition.

If in the end portion of the compression gas chamber a screen is formed, the propelling (burn-off) gas flows through said screen into a diffuser.

Another independent aspect of the invention relates to an airbag module comprising a hybrid gas generator according to the invention. Advantages similar to those already stated in connection with the hybrid gas generator according to the invention and/or with the method for operating a hybrid gas generator according to the invention are resulting.

Another independent aspect of the invention relates to a vehicle safety system, especially an airbag system, comprising a hybrid gas generator according to the invention or comprising an airbag module according to the invention. Advantages similar to those already stated in connection with the hybrid gas generator according to the invention and/or with the method for operating a hybrid gas generator according to the invention are resulting.

BRIEF DESCRIPTION OF THE DRAWINGS

Hereinafter, the invention will be illustrated in detail by way of example embodiments with reference to the attached schematic drawings, wherein.

DESCRIPTION

Figure 1:
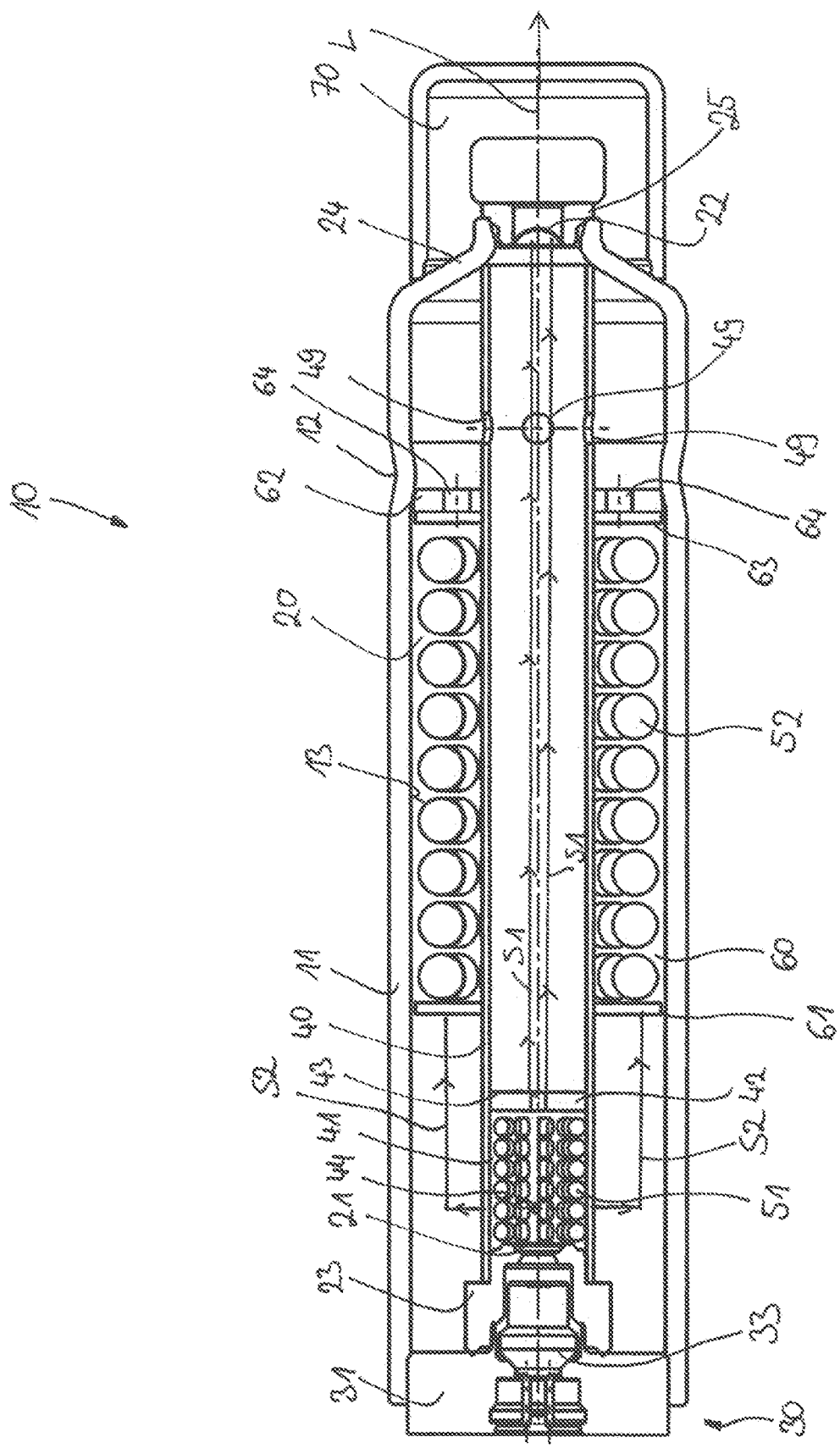
FIG. 1 shows a hybrid gas generator according to the invention in accordance with a first example embodiment.

In the following, like reference numerals will be used for like and equally acting parts.

The hybrid gas generator 10 shown in FIG. 1 comprises an elongate tubular outer housing in the form of a compressed gas chamber housing 11. The hybrid gas generator 10 especially serves for inflating a gas bag, especially an airbag (not shown), wherein it may also comprise an actuator element, especially a hood prop, a belt tensioner or a safety bar element in a vehicle. The hybrid gas generator 10 comprises a central elongate cylindrical compressed gas chamber 20 as well as an igniting unit 30 which includes an igniter 33. The compressed gas chamber 20 is closed by a first igniter-side bursting membrane 21 and a second bursting membrane 22. The second bursting membrane is positioned on the airbag side or on the diffuser side, i.e. it is attached to an area of the hybrid gas generator 10 in the environment of which an airbag (not shown) or a diffuser 70 is located.

In the idle state of the hybrid gas generator 10, i.e. prior to activation thereof, the compressed gas chamber 20 is filled with a compressed gas of helium, a helium/argon mixture or a helium/argon/oxygen mixture at a pressure of from 240 to 1500 bars. The igniting unit 30 comprises a base 31 serving as a support of the igniter 33.

A first bursting element holder 23 which serves for fastening the first bursting element 21 is attached to the igniting unit 30. The second bursting element 22, too, is fastened by means of a second bursting element holder 25 in the housing of the compressed gas chamber 20.

In the compressed gas chamber 20 a first rapidly burning-off pyrotechnic agent 51 and a second pyrotechnic agent 52 burning off slowly as compared to the first pyrotechnic agent 51 are located. The second bursting membrane 22 can be opened by positive pressure generated in the compressed gas chamber 20 upon activation of the hybrid gas generator 10 and, resp., the igniting unit 30. The first pyrotechnic agent 51 is separated from the second pyrotechnic agent 52 in such a way that the positive pressure in the compressed gas chamber 20 for opening the second bursting membrane 22 can be generated by the first pyrotechnic agent 51, concretely speaking by burn-off of the first pyrotechnic agent 51 with appropriate generation of pressure.

In the compressed gas chamber 20 a guide tube 40 is formed. The guide tube 40 takes a cylindrical shape. The guide tube 40 has such length, wherein the length of the guide tube 40 is understood to be the extension in the direction of the longitudinal axis L of the hybrid gas generator 10, which corresponds to approximately 90% of the total length of the compressed gas chamber 20 of the hybrid gas generator 10. The guide tube 40 substantially extends from the first bursting element 21 to about the second bursting element 22. Especially, the guide tube 40 extends to an area of the compressed gas chamber 20 which merges into an end-side tapering 24. That is to say that the guide tube 40 in the shown example does not reach completely, when viewed in the axial length, to the second bursting element 22. The guide tube 40 rests on an inner portion of the tapering 24.

The first pyrotechnic agent 51 may be in the form of granules and/or of compressed pellets, annular bodies and/or of extruded bodies with at least one, especially axial, through-passage and/or of extruded bodies without an axial through-passage. The first pyrotechnic agent 51 is located in a first portion 41 of the guide tube 40 close to the igniter.

The first portion 41 is delimited in the axial direction, i.e. in the direction of the longitudinal axis L of the hybrid gas generator 10, by a disk element 42. The disk element 42 includes a central axial gas outlet 43. In addition, in the first portion 41 of the guide tube 40 at least two radial discharge openings 44 are formed. That is to say that the first pyrotechnic agent 51 provided in the first portion 41 of the guide tube 40 is surrounded by compressed gas of the compressed gas chamber 20.

The second pyrotechnic agent 52, on the other hand, is located in an intermediate chamber 60. The intermediate chamber 60 is delimited by a packing 61 at its first igniter-side end. The packing 61 is configured to be permeable to gas and, resp., to fluid. The second diffuser-side end of the intermediate chamber 60 is formed by a limiting disk 62. The limiting disk 62 includes plural axial through-openings in the form of intermediate chamber outlets 64, with a tamping 63 being applied to the side of the limiting disk 62 facing the intermediate chamber 60 which tamping is made, for example, from an adhesive gas-impermeable metallic foil, e.g. from copper, steel or aluminum. Accordingly, the intermediate chamber outlets 64 may be closed in the non-activated state of the hybrid gas generator 10.

In the non-activated state of the hybrid gas generator 10, the limiting disk 62 prevents the second pyrotechnic agent 52 from leaving the intermediate chamber 60. The limiting disk 62 rests especially on a bead 12 formed circumferentially within the compressed gas chamber housing 11. The intermediate chamber 60 is formed especially between the inner face 13 of the compressed gas chamber housing 11 and the central guide tube 40. In the present case, the compressed gas chamber housing 11 corresponds to an outer housing of the hybrid gas generator 10.

In the shown example, the second pyrotechnic agent 52 is provided in the form of compressed pellets. It is also possible for the second pyrotechnic agent 52 to be provided in different geometric forms such as in the form of stacked rings or as stacked propellant rings, wherein also propellant segments, especially as sections of a ring, may be present to be stringed together so that in total they take a ring shape. Moreover, the second pyrotechnic agent 52 may be provided in common forms such as granules and/or extruded bodies with one or more through-passages and/or extruded bodies without a through-passage.

In the shown example, the intermediate chamber 60 is arranged axially downstream of the first portion 41 of the guide tube 40. It is also possible that the intermediate chamber 60 filled with the second pyrotechnic agent 52 surrounds the first portion 41 of the guide tube 40.

The radial discharge openings 44 in the guide tube 40 form a fluid connection from the first portion 41 of the guide tube 40 to the intermediate chamber 60. Due to the area ratio of the discharge openings 44 to the gas outlet 43 of the disk element 42, the flow behavior of the gas ignited by the first pyrotechnic agent 51 can be determined.

The hot gas and the particles forming during burn-off of the first pyrotechnic agent 51 are thus subdivided. A first part, viz. the major part, escapes through the gas outlet 43 in a flow direction S1 extending substantially in the direction of the longitudinal axis L of the hybrid gas generator 10 into the interior of the guide tube 40. With the aid of the first pyrotechnic agent, thus positive pressure is generated in the interior of the guide tube 40 as well as in the compressed gas chamber 20 so that the second bursting membrane 22 is opened.

Another portion of the gas and of the particles forming during burn-off of the first pyrotechnic agent 51 flow along a flow path and, resp., along a flow direction S2 via the radial discharge openings 44 of the guide tube 40 in the direction of the second pyrotechnic agent 52, wherein they flow through the packing 61 permeable to gas and particles so as to ignite the second pyrotechnic agent. Accordingly, the further portion of the gas and of the particles leaves the interior of the guide tube 40 initially in the radial direction via the discharge openings 44 in order to then continue flowing in an axial direction to the second pyrotechnic agent 52. The first pyrotechnic agent 51 thus acts both as an ignition booster for the second pyrotechnic agent 52 and as positive pressure generator for opening the second bursting membrane 22, as already described before.

The positive pressure required for opening the second bursting element 22 is generated prior to reaching the maximum gas generation rate of the second pyrotechnic agent 52. Accordingly, the compressed gas chamber 20 and, resp., the second bursting element 22 are opened so rapidly that the second pyrotechnic agent 52 is not yet ignited completely and the maximum gas generation rate thereof has not yet been reached. As a consequence, the maximum operating pressures within the hybrid gas generator 10, especially within the compressed gas chamber 20, are lower than in standard hybrid gas generators which work on the principle of positive pressure opening without a portion of shockwaves. The hybrid gas generator according to the invention thus constitutes an improvement for hybrid gas generators that work with a relatively slow positive pressure opening without requiring a supporting and relatively rapid propagation of a shockwave for opening the second bursting element 22. Due to the two pyrotechnic agents 51 and 52, also a hybrid gas generator 10 having a two-stage pyrotechnic charge is provided. Gas generation is prolonged and, resp., is kept steady over a quite long period of time due to the subsequent reaching of the maximum gas generation rate of the second pyrotechnic agent 52. Thus, quasi controlled resupply of propelling gas is made available, wherein airbag service lives, for example, can be increased.

In the operating case of the hybrid gas generator 10, in the intermediate chamber 60 the said propelling gas is generated due to the ignited second pyrotechnic agent 52. After opening the tamping 63, by positive pressure the propelling gas flows through the intermediate chamber outlets 64 of the limiting disk 62 in the direction of radial inlet openings 49 of the guide tube 40. The radial inlet openings 49 serve for the fluid connection of the intermediate chamber 60 to the interior of the guide tube 40. After that, the propelling gas flows through the opened second bursting element 22 into the diffuser 70. Through openings of the diffuser 70, the generated propelling gas and the stored compressed gas flow out of the hybrid gas generator 10.

Figure 2:
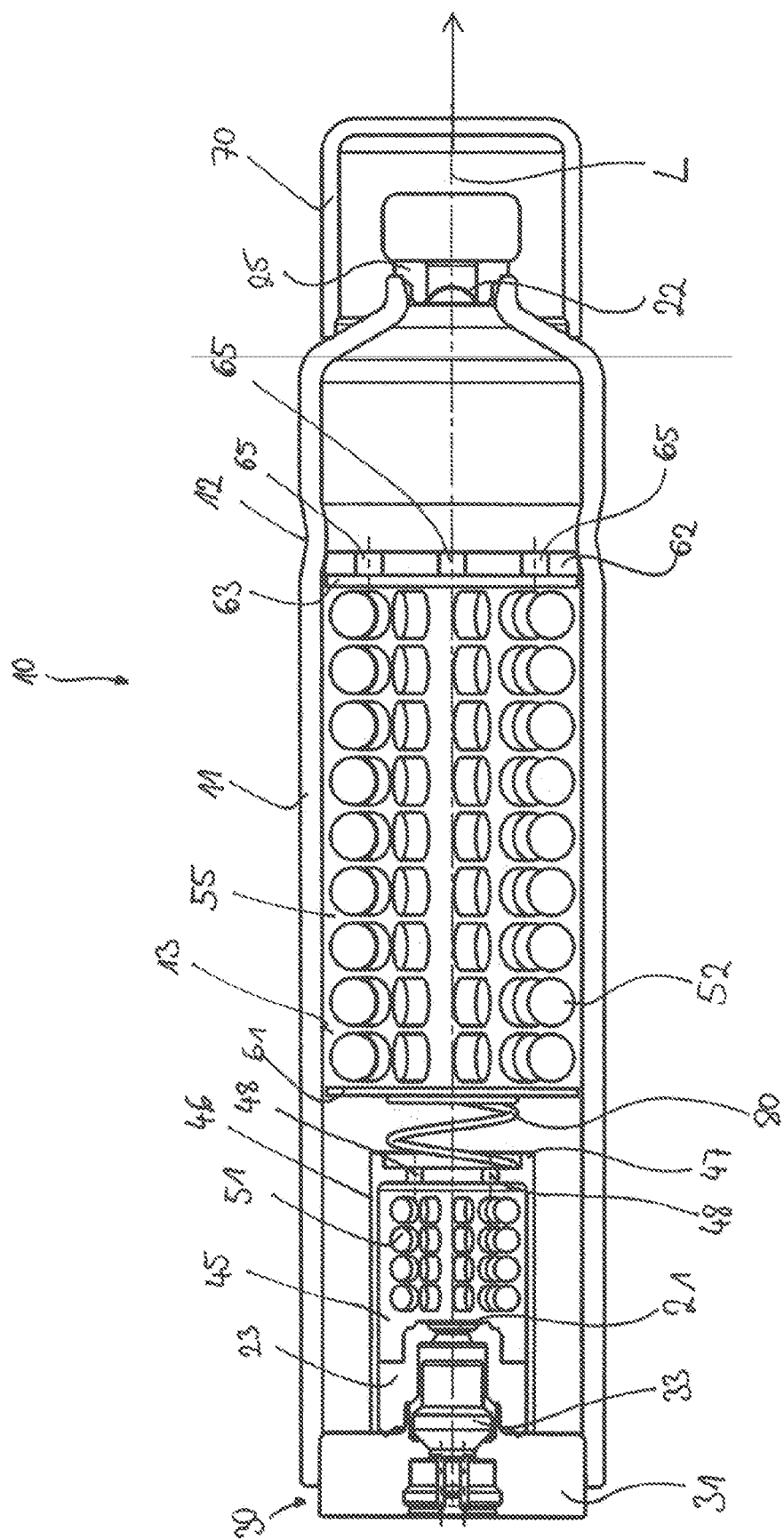
FIG. 2 shows a hybrid gas generator according to the invention in accordance with a second example embodiment.

FIG. 2 illustrates a second embodiment of a hybrid gas generator 10 according to the invention which acts according to the same basic principle as the hybrid gas generator 10 of FIG. 1. That is to say that in the hybrid gas generator 10, too, a compressed gas chamber 20 is formed in which a first rapidly burning-off pyrotechnic agent 51 and a second pyrotechnic agent 52 burning off slowly are located. The second bursting membrane 22 of the compressed gas chamber 20 is opened by positive pressure which can be generated in the compressed gas chamber 20, said positive pressure being primarily generated by the first pyrotechnic agent 51.

The first pyrotechnic agent 51 is located in a pyrotechnic chamber 45 close to the igniter. The second pyrotechnic agent 52 is axially separated from the first pyrotechnic agent 51. The second pyrotechnic agent 52 is located in a portion of the compressed gas chamber 20 in the form of a combustion chamber 55. The combustion chamber 55 is delimited, on the igniter side, by a packing 61 through which gas or particles may flow in the axial direction. On the diffuser side, the combustion chamber 55 corresponding to the intermediate chamber 60 of FIG. 1 is delimited by a limiting disk 62. The limiting disk 62 includes combustion chamber outlets 65. In addition, on the side of the limiting disk 62 facing the combustion chamber 55 a tamping 63 is formed.

The housing 46 of the pyrotechnic chamber 45 has a step-like element 47. Axial chamber discharge openings 48 are equally formed.

In the example embodiment of FIG. 2, too, in the idle state of the hybrid gas generator 10 both the first pyrotechnic agent 51 and the second pyrotechnic agent 52 are surrounded by the stored compressed gas of the compressed gas chamber 20.

Moreover, it is evident that the combustion chamber 55, especially the packing 61, is spaced apart from the pyrotechnic chamber 45 by a spring 80. The spring 80 rests on the step-like element 47 of the housing 46.

In the example embodiment of FIG. 2, upon activation of the hybrid gas generator 10 and, resp., of the igniting unit 30 by generating pressure, energy and/or hot particles by the igniter 33 the first bursting element 51 and thus also the compressed gas chamber 20 are opened from outside. Immediately afterwards, the first pyrotechnic agent 51 is ignited and burnt off, thus causing hot burn-off gases and, resp., particles to leave the pyrotechnic chamber 45 through the chamber discharge openings 48 and to flow through the packing 61 and the spring 80 primarily in the axial direction or, resp., to flow past said components so as to reach the combustion chamber 55. The burn-off gas of the first pyrotechnic agent 51 and the positive pressure forming in this way propagates directly through the combustion chamber 55, while opening the tamping 63 and flowing through the combustion chamber outlets 65, to the second bursting element 22 which is then opened.

In addition, the hot burn-off gases and, resp., particles of the first pyrotechnic agent 51 also ignite the second pyrotechnic agent 52 when entering into the combustion chamber 55, preferably immediately before the second bursting element 22 is opened. In this way, analogously the advantages as described already concerning FIG. 1 are resulting. For example, gas generation is prolonged and, resp., kept steady over a longer period of time due to the subsequent reaching of a maximum gas generation rate of the second pyrotechnic agent 52.

Figure 3:
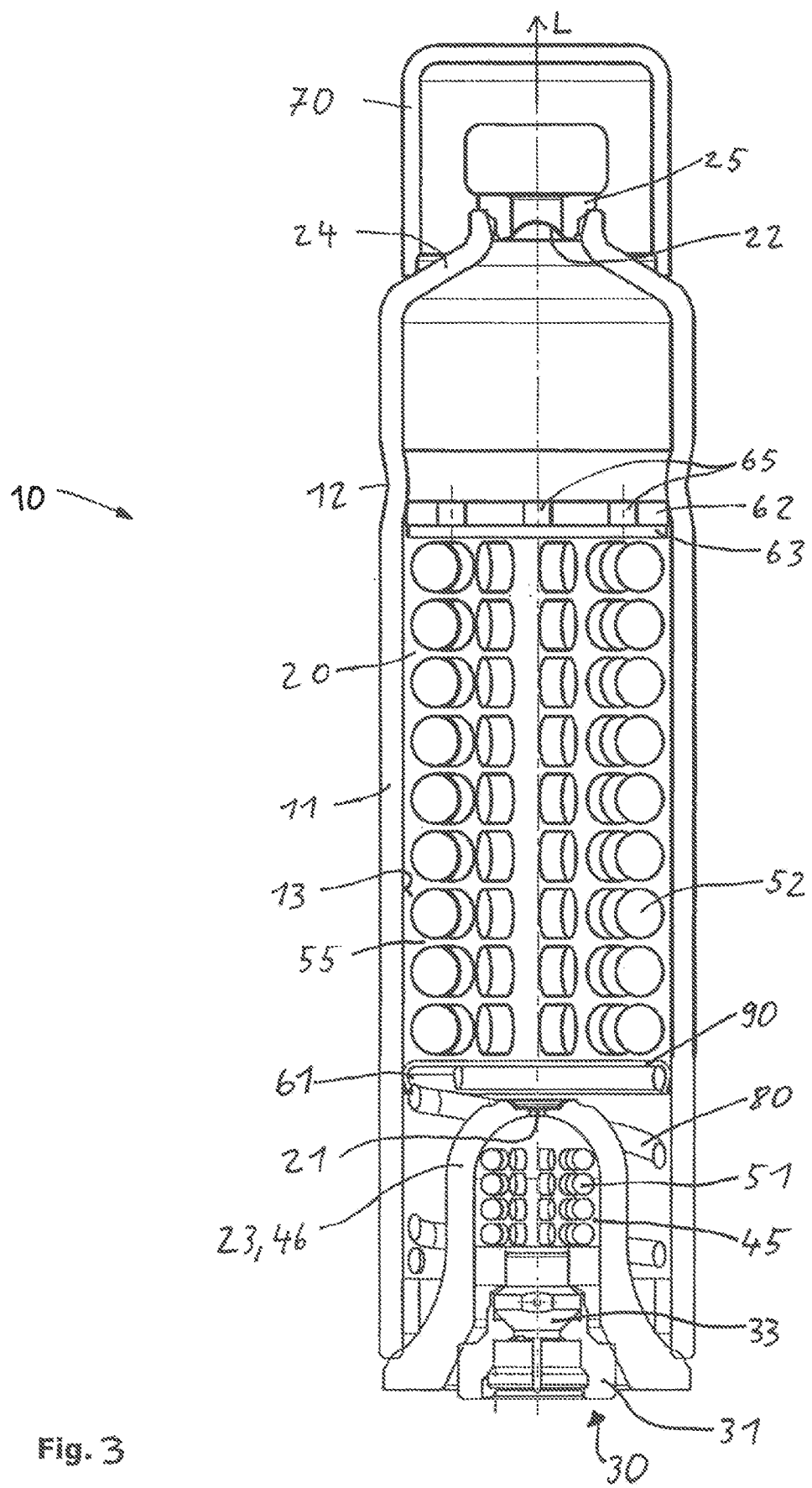
FIG. 3 shows a hybrid gas generator according to the invention in accordance with a third example embodiment.

FIG. 3 illustrates a third embodiment of a hybrid gas generator 10 according to the invention which works on the same basic principle as the hybrid gas generator 10 of FIGS. 1 and 2. That is to say that also in FIG. 3 a first rapidly burning off pyrotechnic agent 51 and a second pyrotechnic agent 52 burning off slowly are located in the hybrid gas generator 10. The second bursting membrane 22 of the compressed gas chamber 20 is opened by positive pressure which can be generated in the compressed gas chamber 20, said positive pressure being primarily generated by the first pyrotechnic agent 51.

Said third embodiment is structured similarly to the second embodiment of FIG. 2, but it shows several differences, wherein the most important ones shall be discussed in the following.

As is illustrated in FIG. 3, in the third embodiment the first pyrotechnic agent 51 is accommodated outside the compressed gas chamber 20 in a chamber 45. Hence the chamber 45 in the non-activated state of the hybrid gas generator 10 is merely under atmospheric ambient pressure of the hybrid gas generator 10. The chamber 45 is surrounded and, resp., partially confined by a housing 46 which at the same time serves and, resp., is configured as a first bursting membrane holder 23. Thus, the chamber 45 is delimited in the axial direction by the first bursting element 21. The chamber 45 and, resp., the first bursting membrane holder 23 are surrounded by a packing 61 including a spring 80 and an axial end in the form of a plate 90 through which gas and particles can flow and which is preferably tightly connected to the spring. The plate 90 may be a perforated plate which, when being biased by the spring 80, presses axially against the second pyrotechnic agent 52 to form volume compensation with respect to the fill level for the second pyrotechnic agent 52 during manufacture of the hybrid gas generator 10 and in the non-activated state thereof.

The specific operating case for the third example embodiment resembles that of FIG. 2. However, in this case after activating the hybrid gas generator 10 and the igniting unit 30, in addition the first pyrotechnic agent 51 is also ignited, outside the compressed gas chamber 20, before the first bursting element 21 and thus also the compressed gas chamber 20 can be opened from outside by burn-off gases and, resp., particles of the igniting unit 30 and of the first pyrotechnic agent 51.

After the burn-off gases and, resp., particles flow into the compressed gas chamber 20 and, resp., the combustion chamber 55 through the opened first bursting element 21, the positive pressure forming in this way propagates directly through the combustion chamber 55, while opening the tamping 63 and flowing through the combustion chamber outlets 65, to the second bursting element 22 which is then opened.

LIST OF REFERENCE NUMERALS 10 hybrid gas generator
11 compressed gas chamber housing
12 bead
13 inner face
20 compressed gas chamber
21 first bursting element
22 second bursting element
23 first bursting element holder
24 tapering
25 second bursting element holder
30 igniting unit
31 base
33 igniter
35 guide tube
41 first portion
42 disk element
43 gas outlet
44 radial discharge opening
45 pyrotechnic chamber
46 housing
47 step-like element
48 chamber discharge opening
49 inlet opening guide tube
51 first pyrotechnic agent
52 second pyrotechnic agent
55 combustion chamber
60 intermediate chamber
61 packing
62 limiting disk
22
63 tamping
64 intermediate chamber outlet
65 combustion chamber outlet
70 diffuser
80 spring
90 plate
L direction of the longitudinal axis of hybrid gas generator
S1 flow direction
S2 flow direction

The invention claimed is:

1. A hybrid gas generator comprising:
a compressed gas chamber closed off by a first bursting membrane and a second bursting membrane;
an igniting unit comprising an igniter;
a first pyrotechnic agent configured to be ignited by the igniter; and
a second pyrotechnic agent configured to be ignited by burning off of the first pyrotechnic agent, the second pyrotechnic agent being configured to burn off slowly as compared to the first pyrotechnic agent;
wherein the second pyrotechnic agent is disposed in the compressed gas chamber and the first pyrotechnic agent is contained within a holder of the igniting unit outside the compressed gas chamber, the first bursting membrane being secured to the holder and separating the first pyrotechnic agent in the holder from the second pyrotechnic agent in the compressed gas chamber;
wherein the separation of the first and second pyrotechnic agents is configured so that the second bursting membrane opens due to a pressure rise in the compressed gas chamber resulting from the burning off of the first pyrotechnic agent, wherein the second pyrotechnic agent is disposed in a combustion chamber within the compressed gas chamber, the combustion chamber being axially separated from a pyrotechnic chamber in the holder where the first pyrotechnic agent is contained, and wherein the combustion chamber is spaced apart from the pyrotechnic chamber by a resilient element.

2. The hybrid gas generator recited in claim 1, wherein the holder is configured to support the first bursting membrane, the holder defining a chamber within the compressed gas chamber that contains the first pyrotechnic agent, wherein the holder and the first bursting membrane isolate the first pyrotechnic agent from the second pyrotechnic agent prior to activation of the inflator.

3. The hybrid gas generator recited in claim 2, wherein the igniter is configured to ignite the first pyrotechnic agent and rupture the first bursting membrane, which opens the holder and releases burn-off gases of the first pyrotechnic agent into the compressed gas chamber, which creates the pressure rise in the compressed gas chamber that opens the second bursting membrane.

4. The hybrid gas generator recited in claim 1, wherein the gas generator is configured so that the pressure rise in the compressed gas chamber opens the second bursting membrane without influence from a shockwave and with the hybrid gas generator being free from projectiles for puncturing the second bursting membrane.

5. The hybrid gas generator according to claim 1, wherein the burning off of the first pyrotechnic agent forms positive pressure in the compressed gas chamber that directly opens the second bursting membrane.

6. An airbag module configured for installation in a vehicle, comprising the hybrid gas generator according to claim 1 and an airbag inflatable by the hybrid gas generator.

7. A vehicle safety system for protecting a person, comprising a hybrid gas generator, an airbag inflatable by the gas generator as part of an airbag module, and an electronic control unit configured to activate the hybrid gas generator when a release situation is given, wherein the hybrid gas generator is configured according to claim 1.

8. A method for operating the hybrid gas generator according to claim 1, comprising steps of:
a) activating the igniting unit of the hybrid gas generator;
b) igniting the first pyrotechnic agent, which ruptures the first bursting membrane and releases burn-off gases into the combustion chamber;
c) building up, via the burn-off gases released into the compressed gas chamber, positive pressure in the compressed gas chamber;
d) igniting the second pyrotechnic agent and partially generating propelling gas;
e) opening the second bursting element due to the built-up positive pressure in the compressed gas chamber;
f) generating further propelling gas by the second pyrotechnic agent; and
g) discharging the further propelling gas through the opened second bursting element.

9. The method for operating the hybrid gas generator according to claim 8, wherein the first pyrotechnic agent acts as ignition booster for the second pyrotechnic agent and as positive pressure generator, wherein the positive pressure required for opening the second bursting element is generated prior to reaching a maximum gas generation rate of the second pyrotechnic agent.

10. The method according to claim 8, wherein the maximum gas generation rate of the second pyrotechnic agent is reached subsequent to the method step e), and/or wherein bursting of the first bursting element is carried out subsequent to the step a) or the step b).

* * * * *